United States Patent
Kumpula et al.

(10) Patent No.: US 8,737,355 B2
(45) Date of Patent: *May 27, 2014

(54) TAKING CONTROL OF SUBSCRIBER TERMINAL

(75) Inventors: Juha Kumpula, Oulu (FI); Jussi Kämäräinen, Oulu (FI); Tomi Liiten, Oulu (FI)

(73) Assignee: Exfo Oy, Oulu (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,188

(22) Filed: Mar. 9, 2012

(65) Prior Publication Data

US 2012/0252454 A1 Oct. 4, 2012

(30) Foreign Application Priority Data

Mar. 29, 2011 (FI) .................................... 20115297

(51) Int. Cl.
  *H04W 4/00* (2009.01)
(52) U.S. Cl.
  USPC ............................ 370/331; 370/332; 455/436
(58) Field of Classification Search
  CPC .................................................. H04W 36/30
  USPC ........ 455/435.1, 435.2, 435.3, 436–444, 448, 455/552.1; 370/328, 331, 338
  See application file for complete search history.

(56) References Cited

U.S. PATENT DOCUMENTS

| | | |
|---|---|---|
| 2008/0020749 A1 | 1/2008 | Delaveau et al. |
| 2008/0108369 A1* | 5/2008 | Visotsky et al. .............. 455/455 |
| 2008/0220777 A1 | 9/2008 | Kouadjo et al. |
| 2009/0232013 A1* | 9/2009 | Kumpula et al. ............. 370/252 |
| 2010/0195641 A1* | 8/2010 | Tsai ............................... 370/352 |
| 2010/0197235 A1* | 8/2010 | Wilhelmsson ............... 455/63.3 |
| 2011/0151909 A1 | 6/2011 | Kumpula et al. |

FOREIGN PATENT DOCUMENTS

| | | |
|---|---|---|
| EP | 2 134 121 A1 | 12/2009 |
| WO | 2007/136309 A1 | 11/2007 |
| WO | 2008/000914 A1 | 1/2008 |

\* cited by examiner

*Primary Examiner* — Magdi Elhag
(74) *Attorney, Agent, or Firm* — Ladas & Parry LLP

(57) ABSTRACT

Taking control of a subscriber terminal. An apparatus comprises a processor configured to cause the apparatus: to control a first stand-alone base station utilizing a first radio access technology RAT to form an emulated first RAT cell and to set parameters of the emulated first RAT cell such that the emulated first RAT cell becomes a tempting destination for a cell reselection by a subscriber terminal utilizing the first RAT; to control a second stand-alone base station such that a formed emulated second RAT cell becomes a preferred destination for a cell reselection; to control the first stand-alone base station so that the ongoing radio connection with the serving cell base station utilizing the first RAT is transferred to continue with the first stand-alone base station utilizing the first RAT; and to control the first stand-alone base station to perform inter RAT cell reselection with the subscriber terminal.

10 Claims, 4 Drawing Sheets

TAKING CONTROL OF SUBSCRIBER TERMINAL

CROSS REFERENCE TO THE CORRESPONDING APPLICATION

This application claims the benefit of Finnish Patent Application No. 20115297 filed on Mar. 29, 2011, the contents of which are incorporated herein by reference.

FIELD

The invention relates generally to taking control of a subscriber terminal, and specifically to an apparatus, method, and computer-readable medium for taking the control.

BACKGROUND

Taking control of the subscriber terminal is useful in some situations, such as in a situation where criminals are using the subscriber terminal for communication. Only government authorized personnel may perform such operations.

BRIEF DESCRIPTION

The present invention seeks to provide an improved apparatus, method and computer program.

According to an aspect of the present invention, there is provided an apparatus as specified in claim 1.

According to another aspect of the present invention, there is provided a method as specified in claim 6.

According to another aspect of the present invention, there is provided a computer program as specified in claim 10.

LIST OF DRAWINGS

Figure 1:
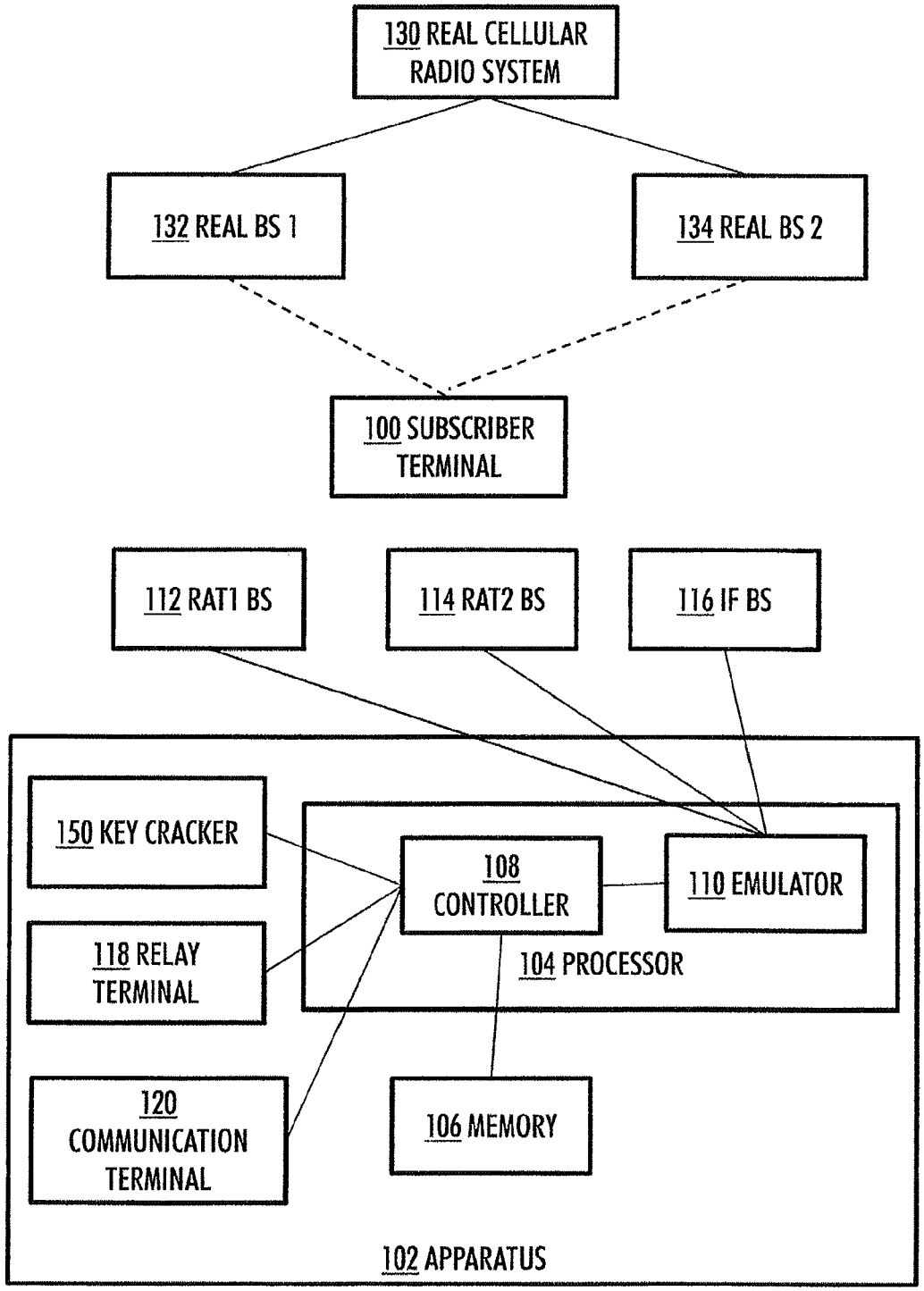
Figure 2:
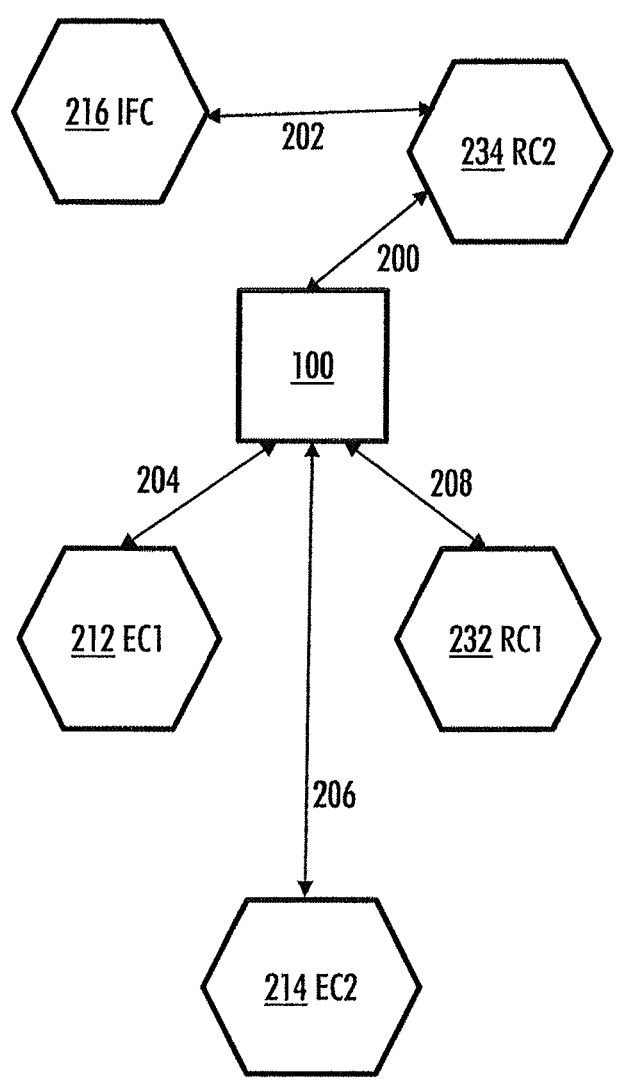
Figure 3:
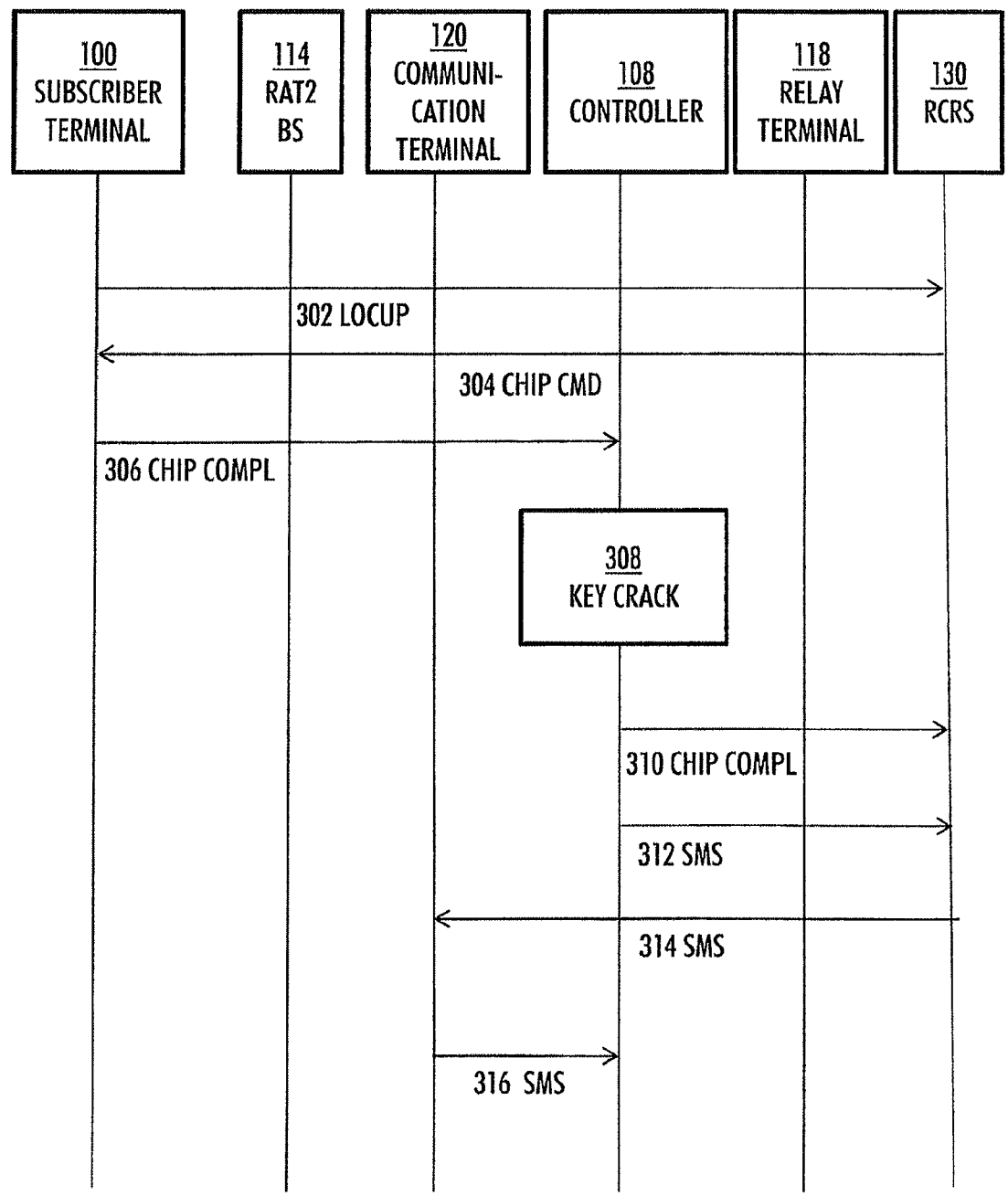
Figure 4:
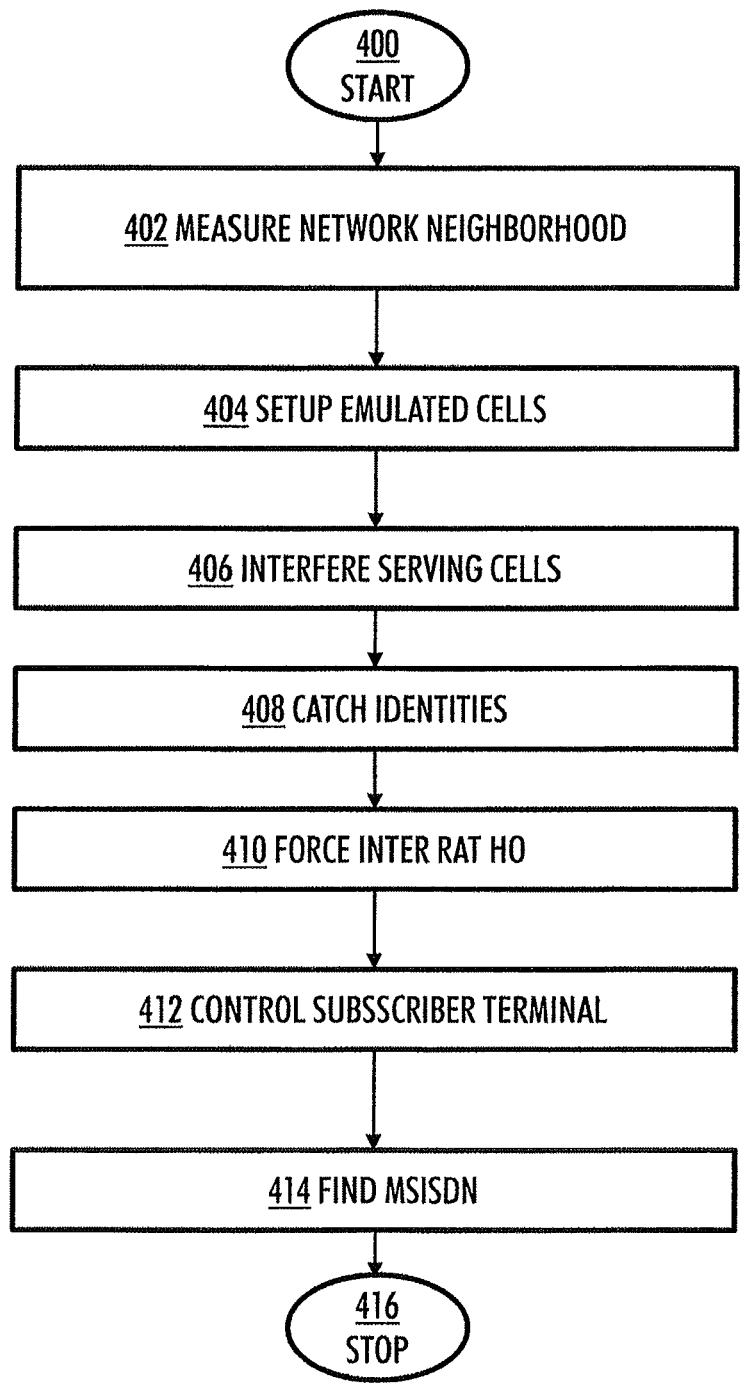

Embodiments of the present invention are described below, by way of example only, with reference to the accompanying drawings, in which FIG. 1 illustrates embodiments of an apparatus; and FIG. 2 illustrates interaction of a subscriber terminal and cellular radio cells; and FIG. 3 illustrates finding MSISDN numbers of subscriber terminals; and FIG. 4 illustrates various stages in taking control of subscriber terminals.

DESCRIPTION OF EMBODIMENTS

The following embodiments are exemplary. Although the specification may refer to "an" or "one" embodiment(s) in several locations, this does not necessarily mean that each such reference is to the same embodiment(s), or that the feature only applies to a single embodiment. Single features of different embodiments may also be combined to provide other embodiments. The present invention is applicable to any cellular radio system that supports the functionality that will be described in the following. The protocols and the specifications of the cellular radio systems develop rapidly. Such development may require extra changes to an embodiment. Therefore, all words and expressions should be interpreted broadly and they are intended to illustrate, not to restrict, the embodiment.

FIG. 1 only shows some elements and functional entities, all being logical units whose implementation may differ from what is shown. The connections shown in FIG. 1 are logical connections; the actual physical connections may be different. Interfaces between the various elements may be implemented with suitable interface technologies, such as a message interface, a method interface, a sub-routine call interface, a block interface, or any means enabling communication between functional sub-units. It should be appreciated that apparatuses may comprise other units. However, they are irrelevant to the actual invention and, therefore, they need not to be discussed in more detail here.

FIG. 1 discloses a single apparatus 102 for taking control of a subscriber terminal, but the actual implementation may contain more than one apparatuses, coupled together by a communications interface, and co-operating to control the subscriber terminal.

FIG. 1 shows two base stations 132, 134, both being part of a real cellular radio system 130. 'Real' refers to the fact that the cellular radio system 130 is authorized by the authorities and it provides continuous service for the users. Both base stations 132, 134 form real cells 232, 234 (illustrated in FIG. 2). The cellular radio system 130 may be a multiband radio system where the cells operate on different radio frequency bands.

The cellular radio system 130 may operate according to the GSM (Global System for Mobile Communications), LTE (3GPP Long Term Evolution), UMTS (Universal Mobile Telecommunications System), WiMAX (Worldwide Interoperability for Microwave Access), WLAN (Wireless Local Area Network) standard, or any other suitable standard/non-standard way. The cellular radio system 130 may be a mixture of multiple different cellular radio system.

A subscriber terminal 100 is camped into a serving real cell 232 or 234. The subscriber terminal 100 is a piece of equipment or a device that is configured to associate the subscriber terminal 100 and its user with a subscription and allows a user to interact with the cellular radio system 130, i.e. the subscriber terminal 100 is capable of requesting service from the cellular radio system 130. The subscriber terminal 100 presents information to the user and allows the user to input information. In other words, the subscriber terminal 100 may be any terminal capable of receiving wirelessly information from and/or transmitting wirelessly information to the cellular radio system 130. The subscriber terminal 100 may refer to a portable mobile communication device operating with or without a subscriber identification module (SIM), including, but not limited to, the following types of devices: mobile phone, smartphone, personal digital assistant (PDA), user equipment, or other portable communication device possibly including computer functionalities or functionalities of other data processing devices.

The actual apparatus 102 for controlling subscriber terminal in the cellular radio system 100 is also illustrated in FIG. 1. The apparatus 102 comprises a processor 104. The apparatus 102 may also comprise a memory 106 for saving settings data, information on targeted subscriber terminals, etc. The apparatus 102 may be of the type utilized in telecommunication testing and measurement. The apparatus 102 may be a measuring device, such as a simulator. The apparatus 102 may be for instance a protocol simulator used for testing the operation of a data transmission system. The apparatus 102 may also be a computer provided with for instance Microsoft Windows® or some other operating system and dedicated protocol simulator software. The apparatus 102 may further comprise a number of other devices, such as a user interface and communication equipment. The user interface allows controlling the operations of the apparatus 102 and monitoring the operations carried out by the apparatus 102. The user interface may comprise a display and a keyboard, for example. Depending on the apparatus 102, the user interface may comprise various other user interface parts.

The processor 104 may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The processor 104 may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus 102, necessary processing capacity, production costs, and production volumes, for example.

The stand-alone base stations 112, 114, 116 may be implemented just like the real base station 132. 'Stand-alone' refers to the fact that the stand-alone base station is not part of the real cellular radio system 130 and it does not provide continuous service for the users. The purpose of the stand-alone base stations is to perform required radio interface functions in taking control of the subscriber terminals 100.

As illustrated in FIG. 1, the taking control of subscriber terminal functionalities may be divided into two parts in the processor 104: an emulator 110, which emulates the necessary network functions (a radio network controller, for example) of the cellular radio system 130 towards the stand-alone base stations 112, 114, 116 and the subscriber terminal 100, and a controller 108, which controls the emulator 110 and receives information about the cellular radio system 130.

Stand-alone base stations 112, 114, 116 may comprise base stations of different radio access technologies (RAT), a base station may be a GSM BTS (base transceiver station) or an eNodeB of UMTS, for instance.

The controller 108 may obtain the information about the cellular radio system 130 from a suitable source: from another apparatus via a communication interface (not illustrated in FIG. 1), from a user of the apparatus 102 via its user interface (not illustrated in FIG. 1), or from a measurement terminal 118.

The measurement terminal 118 may be implemented on a platform provided by a normal mobile telephone. The measurement features/parts may easily be implemented on top of the platform with suitable software and hardware components. All modifications and configurations required for implementing functionality may be performed as routines, which may be implemented as added or updated software routines, application circuits (ASIC) and/or programmable circuits, for example.

FIG. 4 illustrates the performing various stages in taking control of subscriber terminals. The method begins in 400.

In 402, the processor 104 is configured to use the measurement terminal 118 to measure parameters of the first and second RAT neighborhood cells. The parameters may include reception quality and neighbor cell lists. In 404, the processor 104 is configured to configure the stand alone base stations 112, 114 to form the cells 212, 214, and the processor 104 is configured to set parameters of the emulated cell 212 of the first RAT such that the emulated cell becomes a tempting destination for a cell reselection. The processor 104 is configured to form at least one emulated second RAT cell 214. The second RAT cell 214 parameters are set so that it is preferred in cell selection. It may be controlled into a channel that has minimum interference from real cellular radio system 130 in order to make the subscriber terminal 100 to perform RAT reselection to select the cell 214.

In 406, the processor 104 is configured to interfere neighborhood cells of the first RAT in order to cause the one or more subscriber terminals 100 to camp into the emulated cell 212. The processor 104 may be configured to interfere the serving cells by at least one of: starting the transmission of the emulated first RAT cell 212, forming at least one second emulated first RAT cell masquerading the serving cell, forming at least one second RAT 216 cell to interfere communications in first RAT cells.

In 408, the processor 104 is configured to catch one or more identifiers of the one or more subscriber terminals 100 camping into the emulated cell 212 after the start of the emulated cell transmission.

If a subscriber terminal 100 is an identified target terminal, the terminal 100 is controlled to perform an inter RAT cell change to the second RAT in 410.

In 412, the processor 104 is configured to control the subscriber terminal 100 to camp into the emulated first RAT cell 214 as a response to the performed inter RAT cell change.

In 414, the processor 104 is configured to find the MSISDN of the subscriber terminal 100.

The steps illustrated in FIG. 4 may be performed in parallel for multiple subscriber terminals 100. It is also possible the some of the steps are left out or are performed in different order.

FIG. 2 illustrates interaction of the subscriber terminal and cellular radio cells in multiband radio system in taking control of subscriber terminal as will be described next. FIG. 2 describes an embodiment where the first RAT is UMTS and the second RAT is GSM.

Real cells 232, 234 are UMTS FDD (frequency duplex division) cells operating on different frequency bands. All of the cells 232, 234, 212, 214, 216 are operating in an overlapping geographical area. Emulated cell 212 is operating on the same frequency with the real cell 232 and is configured by the processor 104 to take control of subscriber terminals 100 camping into it as previously described. A subscriber terminal 100 camping into different cells is presented with connections 200, 204, 208. In a multiband system, subscriber terminals 100 may be camped into either one of the real cells 232, 234. If the apparatus 102 does not contain a UMTS base station for the second frequency band, it is impossible to control subscriber terminals 100 camped into cell 234. Therefore, one or more of the stand-alone base stations 116 are used to form one or more cells 216 for interfering 202 communications in the non-controlled frequency bands of the first RAT in order to favor subscriber terminals 100 to camp into the controlled frequency bands of the first RAT. In this case, the processor 104 may be configured to control GSM base station 116 to form a cell 216 into mid transmit frequency of the real UMTS cell 234. This causes subscriber terminal 100 camped 200 on the cell 234 to detect interference, and, due to interference, camp into the first frequency band, and thus to camp into 204 the emulated cell 212.

The processor 104 is configured to catch one or more identifiers of the one or more subscriber terminals camping into 204 the emulated cell 212 and in the case one or more subscriber terminal 100 is an identified target terminal, the terminals 100 are controlled to perform an inter RAT cell change to the GSM RAT. The processor 104 is configured to control the one or more subscriber terminals 100 camping into 206 the emulated cell 214 due to the performed inter RAT cell change.

As disclosed, the base stations 112, 114, 116 may be utilized either in interfering or in network emulation, reducing overall investment costs.

Taking control of the subscriber terminal 100 may operate with more than two RATs simultaneously, in such case the first RAT cells 212 may be (not illustrated in FIG. 2) a UMTS RAT cell and an LTE RAT cell.

Subscriber terminals 100 may be controlled to perform an inter RAT cell change from UMTS to GSM network. It is not a straightforward task because of the integrity protection of the UMTS network that tries to prevent unauthorized communication. A few different scenarios enabling controlling of the inter RAT cell change are described next.

In an embodiment, inter RAT handover is implemented by setting the neighbor cell list of the emulated UMTS cell 212 so that it contains only emulated GSM cells 214. After user terminal is identified, and detected a target, a LOCATION UPDATE FAILURE command is send to the terminal, causing the terminal to release the connection and to perform inter RAT cell change to the emulated GSM network cell 214.

The same result may be achieved for REL-6, and later releases, by including "Redirection info" setting GSM as target RAT in RRC CONNECTION RELEASE PDU. As described in 3GPP TS 25.331 chapter 8.5.2., on this occasion subscriber terminal 100 must search for a suitable cell on given RAT and camp on it, or find an acceptable cell from the given RAT if suitable cell is not found. When "Redirection info" specifies GSM as target RAT, subscriber terminal 100 performs cell selection on the given GSM frequency, acquires system information and registers to GSM network if not yet registered.

Another way is to use the inter system cell change order from UTRAN procedure. The procedure is initiated by sending CELL CHANGE ORDER FROM UTRAN command to the subscriber terminal containing emulated GSM cell 214 as target cell. When the terminal receives the command, it moves to the given GSM frequency and continues with normal location/routing area updating procedure.

To speed up the procedure, multiple emulated first RAT cells 212 may be formed to cover multiple real network cells, the cells may be using different frequency bands or primary scrambling codes. It is also possible to use multiple emulated second RAT cells 214 to speed up inter RAT cell change processing, in that case contents of the inter RAT cell change control signaling can be set to indicate different emulated RAT cells 214.

FIG. 3 illustrates finding MSISDN number of subscriber terminals. As a part of the process, a communication terminal 120 is used by the controller to receive SMS messages or calls from the real cellular radio system 130.

The controller 108 controls the relay mobile terminal 118 to emulate the target mobile terminal 100 towards the network. The procedure may be used to find out MSISDN of one or multiple terminals 100. Method steps may be performed in parallel to speed up the process when searching MSISDN of multiple terminals. In such case, multiple relay terminals 118 are used for emulation of target subscriber terminals 100.

Procedure starts when a subscriber terminal 100 transmits location update command 302 to camp into the emulated GSM RAT cell 214. The location update is forwarded through the controller 108 and sent via the relay terminal 118 to the real cellular radio system 130. The radio system 130 replies with ciphering mode command 304 to set up encryption. The controller 108 forwards the reply to the subscriber terminal 100.

When the subscriber terminal 100 receives the ciphering mode command, it sets up ciphering according to the command, and uses its encryption key to encrypt messages it transmits later on. As a reply to the ciphering mode command, the subscriber terminal 100 transmits ciphering mode complete 306, the message is ciphered.

The controller 108 receives the ciphering mode complete command and controls a key cracking device 150 to crack 208 the encryption key used in the subscriber terminal 100. As a result, the controller 108 gets the encryption key from the cracking device 150. From now on, the controller 108 uses the key to decipher all messages transmitted by the subscriber terminal 100. The key is also provided to relay terminal 118 to cipher messages it transmits in order to make it look like the subscriber terminal 100 towards the real cellular radio system 130. To complete ciphering setup, the reply message is forwarded to the network through the relay terminal 118. From this point on, the controller 108 may control the subscriber terminal 100 freely because the encryption key used by the terminal 100 is known by the controller 108.

To find out the MSISDN of the subscriber terminal 100, the controller 108 controls the measurement terminal 118 that emulates the subscriber terminal 100 to transmit an SMS 312 containing the IMSI number of the subscriber terminal 100 in SMS content text to the communication terminal 120.

Cellular radio system 130 locates MSISDN of the subscriber terminal 100 from registers, attaches it to the SMS and delivers SMS 314 to the communication terminal 120. The SMS is read 316 by the controller 108, and the MSISDN and the IMSI of the subscriber terminal 100 are found.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising a processor configured to cause the apparatus:
to control a first stand-alone base station utilizing a first radio access technology (RAT) to form an emulated first RAT cell and to set parameters of the emulated first RAT cell such that the emulated first RAT cell becomes a tempting destination for a cell reselection by a subscriber terminal having an ongoing radio connection with a serving cell base station belonging to a cellular radio system and utilizing the first RAT;
to control a second stand-alone base station utilizing a second RAT to form an emulated second RAT cell and to set parameters of the emulated second RAT cell such that the emulated second RAT cell becomes a preferred destination for a cell reselection;
to control the first stand-alone base station utilizing the first RAT to perform cell reselection with the subscriber terminal so that the ongoing radio connection with the serving cell base station utilizing the first RAT is transferred to continue with the first stand-alone base station utilizing the first RAT; and
to control the first stand-alone base station utilizing the first RAT and the second stand-alone base station utilizing the second RAT to perform inter RAT cell reselection with the subscriber terminal so that the ongoing radio connection with the first stand-alone base station utilizing the first RAT is transferred to continue with the second stand-alone base station utilizing the second RAT;

wherein the processor is further configured to cause the apparatus to control a third stand-alone base station utilizing the second RAT to interfere a first frequency band of the serving cell base station utilizing the first RAT, on which first frequency band the subscriber terminal is having the ongoing radio connection with the serving cell base station utilizing the first RAT.

2. The apparatus of claim 1, wherein the processor is further configured to cause the apparatus:

to control the first stand-alone base station utilizing the first RAT to form the emulated first RAT cell on a second frequency band, which second frequency band is different from the first frequency band;

to control the first stand-alone base station utilizing the first RAT to perform cell reselection with the subscriber terminal so that the ongoing radio connection on the first frequency band with the serving cell base station utilizing the first RAT is transferred to continue on the second frequency band with the first stand-alone base station utilizing the first RAT; and to control the first stand-alone base station utilizing the first RAT and the second stand-alone base station utilizing the second RAT to perform inter RAT cell reselection with the subscriber terminal so that the ongoing radio connection on the second frequency band with the first stand-alone base station utilizing the first RAT is transferred to continue with the second stand-alone base station utilizing the second RAT.

3. The apparatus of claim 1, wherein the processor is further configured to cause the apparatus:

to control the first stand-alone base station utilizing the first RAT to set parameters of the emulated first RAT cell such that the neighbor cell list of the emulated first RAT cell only contains the emulated second RAT cells; and to control the first stand-alone base station utilizing the first RAT and the second stand-alone base station utilizing the second RAT to perform inter RAT cell reselection with the subscriber terminal by transmitting a location update failure command to the subscriber terminal, causing the subscriber terminal to release the ongoing radio connection with the first stand-alone base station utilizing the first RAT, and to perform inter RAT cell reselection to the second stand-alone base station utilizing the second RAT.

4. The apparatus of claim 1, wherein the processor is further configured to cause the apparatus:

to control the first stand-alone base station utilizing the first RAT to set parameters of the emulated first RAT cell such that the second RAT is included in redirection info in a radio resource control (RRC) connection release packet data unit (PDU); and to control the first stand-alone base station utilizing the first RAT and the second stand-alone base station utilizing the second RAT to perform inter RAT cell reselection with the subscriber terminal by transmitting system information to the subscriber terminal, causing the subscriber terminal to release the ongoing radio connection with the first stand-alone base station utilizing the first RAT, and to perform cell inter RAT cell reselection to the second stand-alone base station utilizing the second RAT.

5. The apparatus of claim 1, wherein the processor is further configured to cause the apparatus:

to control a measurement terminal that emulates the subscriber terminal towards the serving cell base station to transmit a message containing the international mobile subscriber identity (IMSI) number of the subscriber terminal to a communication terminal that is part of the apparatus; and to read IMSI and mobile subscriber ISDN number (MSISDN) from the message transmitted to and received by the communication terminal, which MSISDN is attached to the message by the cellular radio system.

6. A method comprising:

controlling a first stand-alone base station utilizing a first radio access technology (RAT) to form an emulated first RAT cell and to set parameters of the emulated first RAT cell such that the emulated first RAT cell becomes a tempting destination for a cell reselection by a subscriber terminal having an ongoing radio connection with a serving cell base station belonging to a cellular radio system and utilizing the first RAT;

controlling a second stand-alone base station utilizing a second RAT to form an emulated second RAT cell and to set parameters of the emulated second RAT cell such that the emulated second RAT cell becomes a preferred destination for a cell reselection;

controlling the first stand-alone base station utilizing the first RAT to perform cell reselection with the subscriber terminal so that the ongoing radio connection with the serving cell base station utilizing the first RAT is transferred to continue with the first stand-alone base station utilizing the first RAT; and controlling the first stand-alone base station utilizing the first RAT and the second stand-alone base station utilizing the second RAT to perform inter RAT cell reselection with the subscriber terminal so that the ongoing radio connection with the first stand-alone base station utilizing the first RAT is transferred to continue with the second stand-alone base station utilizing the second RAT;

the method further comprising controlling a third stand-alone base station utilizing the second RAT to interfere a first frequency band of the serving cell base station utilizing the first RAT, on which first frequency band the subscriber terminal is having the ongoing radio connection with the serving cell base station utilizing the first RAT.

7. The method of claim 6, further comprising:

controlling the first stand-alone base station utilizing the first RAT to form the emulated first RAT cell on a second frequency band, which second frequency band is different from the first frequency band;

controlling the first stand-alone base station utilizing the first RAT to perform cell reselection with the subscriber terminal so that the ongoing radio connection on the first frequency band with the serving cell base station utilizing the first RAT is transferred to continue on the second frequency band with the first stand-alone base station utilizing the first RAT; and controlling the first stand-alone base station utilizing the first RAT and the second stand-alone base station utilizing the second RAT to perform inter RAT cell reselection with the subscriber terminal so that the ongoing radio connection on the second frequency band with the first stand-alone base station utilizing the first RAT is transferred to continue with the second stand-alone base station utilizing the second RAT.

8. The method of claim 6, further comprising:

either controlling the first stand-alone base station utilizing the first RAT to set parameters of the emulated first RAT cell such that the neighbor cell list of the emulated first RAT cell only contains the emulated second RAT cells; and controlling the first stand-alone base station utilizing the first RAT and the second stand-alone base station utilizing the second RAT to perform inter RAT cell reselection with the subscriber terminal by transmitting a location update failure command to the subscriber terminal, causing the subscriber terminal to release the ongoing radio connection with the first stand-alone base station utilizing the first RAT, and to perform inter RAT cell reselection to the second stand-alone base station utilizing the second RAT; or controlling the first stand-alone base station utilizing the first RAT to set parameters of the emulated first RAT cell such that the second RAT is included in redirection info in a radio resource control (RRC) connection release packet data unit (PDU); and controlling the first stand-alone base station utilizing the first RAT and the second stand-alone base station utilizing the second RAT to perform inter RAT cell reselection with the subscriber terminal by transmitting system information to the subscriber terminal, causing the subscriber terminal to release the ongoing radio connection with the first stand-alone base station utilizing the first RAT, and to perform cell inter RAT cell reselection to the second stand-alone base station utilizing the second RAT.

9. The method of claim 6, further comprising:

controlling a measurement terminal that emulates the subscriber terminal towards the serving cell base station to transmit a message containing the international mobile subscriber identity (IMSI) number of the subscriber terminal to a communication terminal; and reading IMSI and mobile subscriber ISDN number (MSISDN) from the message transmitted to and received by the communication terminal, which MSISDN is attached to the message by the cellular radio system.

10. A non-transitory computer-readable medium comprising computer program instructions which, when loaded into an apparatus, cause the apparatus to perform the steps of claim 6.

\* \* \* \* \*